(12) United States Patent
Santiago

(10) Patent No.: US 7,309,057 B2
(45) Date of Patent: Dec. 18, 2007

(54) GUILLOTINE VALVE

(75) Inventor: Osvaldo Rodrigues Santiago, Itapecirica da Serra (BR)

(73) Assignee: Weir Do Brasil Ltda. (BR)

( * ) Notice: Subject to any disclaimer, the term of this patent is extended or adjusted under 35 U.S.C. 154(b) by 0 days.

(21) Appl. No.: 10/501,649

(22) PCT Filed: Jan. 10, 2003

(86) PCT No.: PCT/BR03/00002

§ 371 (c)(1),
(2), (4) Date: Feb. 22, 2005

(87) PCT Pub. No.: WO03/060360

PCT Pub. Date: Jul. 24, 2003

(65) Prior Publication Data

US 2005/0145818 A1    Jul. 7, 2005

(30) Foreign Application Priority Data

Jan. 15, 2002    (BR) .................................... 0200134

(51) Int. Cl.
*F16K 3/00*    (2006.01)
(52) U.S. Cl. ...................... 251/172; 251/355; 277/646
(58) Field of Classification Search ............... 251/193, 251/195, 328, 170–172, 355, 175; 277/646
See application file for complete search history.

(56) References Cited

U.S. PATENT DOCUMENTS

| | | | |
|---|---|---|---|
| 1,868,147 A * | 7/1932 | Kruse | ......................... 251/172 |
| 3,333,816 A | 8/1967 | Williams | |
| 3,367,625 A * | 2/1968 | Fortune | ...................... 251/172 |
| 3,475,004 A * | 10/1969 | Jennings | ..................... 251/175 |
| 3,711,062 A * | 1/1973 | Kirkwood | .................... 251/172 |
| 3,778,030 A * | 12/1973 | Carlin | ......................... 251/355 |
| 4,145,026 A * | 3/1979 | Chronister | .................. 251/199 |
| 4,340,204 A * | 7/1982 | Herd | .......................... 251/355 |
| 4,527,773 A | 7/1985 | Muller | |
| 4,693,447 A | 9/1987 | Perez | |
| 4,776,564 A * | 10/1988 | Westenberg | ................. 251/193 |
| 5,150,881 A | 9/1992 | Mc Kavanagh | |
| 5,176,189 A * | 1/1993 | Perchthaler et al. | ........ 251/172 |
| 5,271,426 A | 12/1993 | Clarkson | |

FOREIGN PATENT DOCUMENTS

| | | |
|---|---|---|
| GB | 2091845 | 8/1982 |
| JP | 11-063249 A | 3/1999 |

* cited by examiner

*Primary Examiner*—John Bastianelli
(74) *Attorney, Agent, or Firm*—Cantor Colburn LLP

(57) ABSTRACT

A guillotine valve, used for example in pipelines includes a single block body incorporating sealing elements, each in the form of an annular hose section, which are made of an elastomeric material and which are hollow along their entire circumference, each providing an airtight pneumatic circumferential chamber filled with air. Due to the compressibility of the chambers the contact faces of the hose sections deform uniformly in relation to a closing blade. Convex contours on the internal faces of the hose sections result in a further sealing effect due the pressing together of the contact faces by the pressure of the pipeline fluid. The hose sections can each also incorporate a T-shaped metal core comprising an axial portion and a radial portion.

5 Claims, 4 Drawing Sheets

GUILLOTINE VALVE

TECHNICAL FIELD OF INVENTION

The present description refers to an Invention Patent dealing with an improvement introduced into a guillotine valve, also known as slide valve or gate valve. The valve in question, regardless of its various denominations, is used as a means for controlling a flow in pipelines where dense fluids or fluids containing a large amount of solid material are circulating.

BRIEF DESCRIPTION OF THE RELATED ART

In synthesis, the guillotine valves work by the principle of dislocating a closing blade traversing the valve body, thus closing the fluid passage through the same. Generally, the closing blade can be moved in various forms, its actuating can be manual, hydraulic, pneumatic or even electric.

The conventional guillotine valves present annular sealing means mounted on the valve body and establishing a direct contact with the faces of the closing blade when the latter is fully advanced, thus producing the obstruction of the fluid, and further assuring the sealing of the pipeline when the mentioned blade is fully withdrawn; the valves in question can be of the passing gate and of the non passing gate type.

In spite of their simplicity and widespread use, the guillotine valves pertaining to the state of the art present aspects which can be improved, mainly with respect to the sealing means employed in the same.

BRIEF SUMMARY OF THE INVENTION

The invention provides an improved guillotine valve presenting a more efficient sealing system than the conventional ones.

BRIEF DESCRIPTION OF THE DRAWINGS

Referring now to the drawings wherein like elements are numbered alike in the several FIGURES:

FIG. 2 illustrates a front view of the valve hereby dealt with;

DETAILED DESCRIPTION OF THE INVENTION

Figure 1:
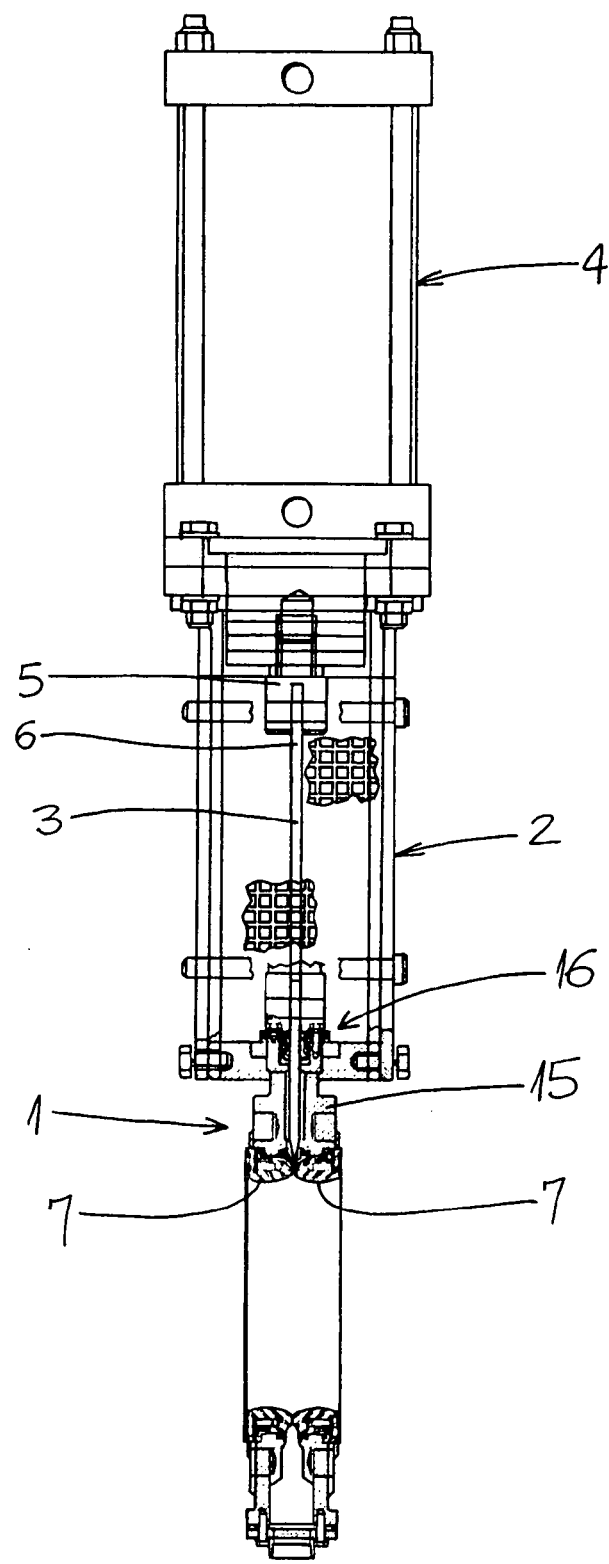
FIG. 1 illustrates a side view with a partial cross section of the now proposed guillotine valve, which is shown in its fully open state, i.e., with its closing blade fully withdrawn.
Figure 2:
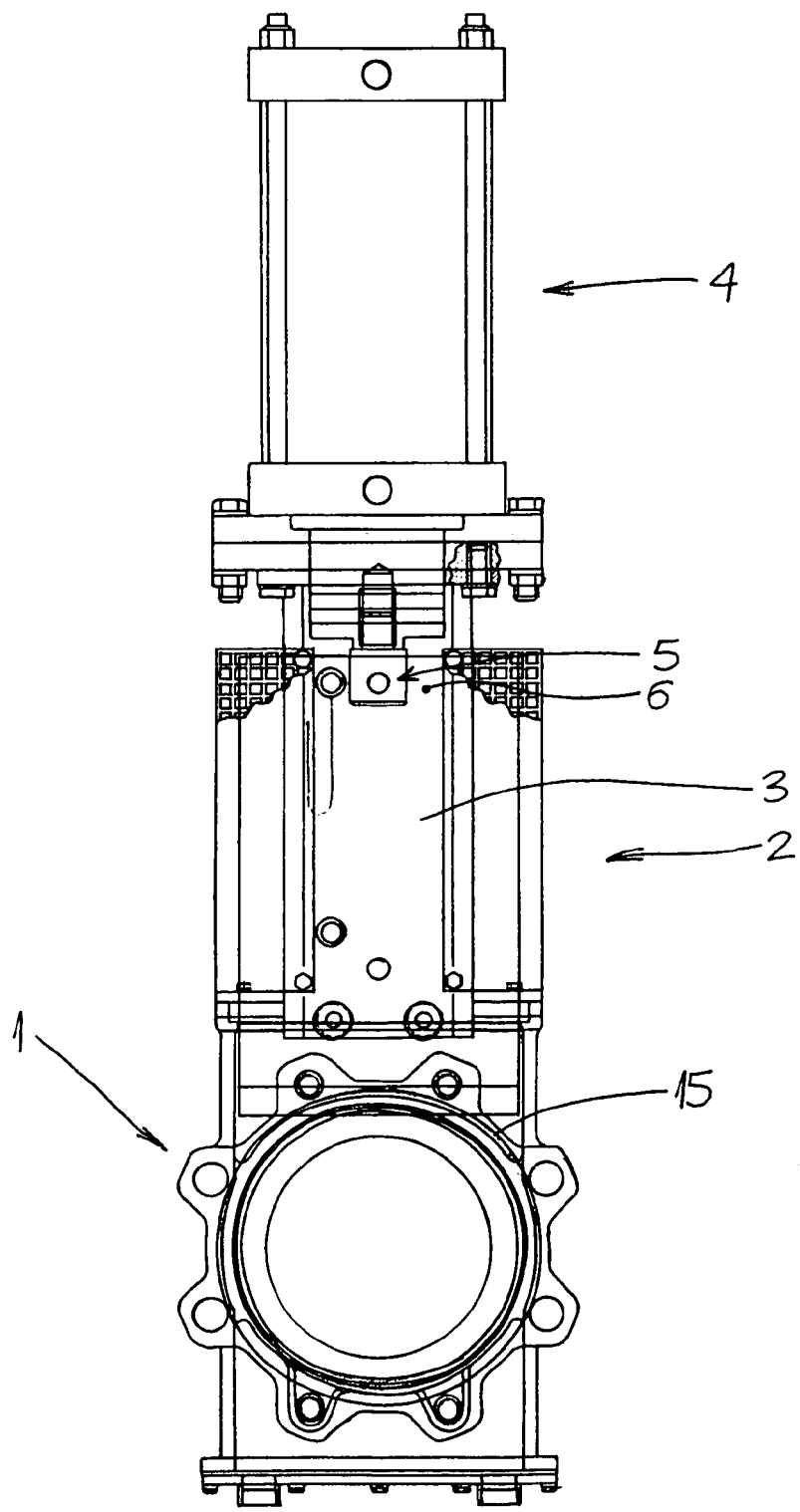

According to what is shown on the figures listed above, the guillotine valve, which is the object of this invention patent, comprises basically a single metal body 1, of single block construction, on top of which is mounted a sustaining structure 2, which for its part receives the mechanic actuation assembly of the closing blade 3. In the specific case of FIG. 1 there is illustrated, as a mere example without limitations, the use of an actuator 4, which can be either hydraulic or pneumatic, which at the extremity of its telescope rod 5 has mounted the extreme upper portion 6 of the closing blade 3.

The employment of the actuator 4 shall be understood as one of the many actuating modalities which can be used in the present case, and which for this reason is not the focus of the present invention patent.

The single block body 1 is normally assembled between two sectors of a pipeline, through which circulates the fluid which eventually shall be obstructed by actuating the valve in question.

The single block body 1 incorporates on each of its two faces, i.e., downstream or upstream with relation to the flow direction of the fluid passing the valve, two sealing elements 7, mounted in a fully opposite form and in mutual contact.

The sealing elements 7, also called hose sections, are manufactured from elastomeric material, presenting the feature of being interchangeable.

The hose sections 7, as is well illustrated by the figures integrating this invention patent, are fully hollow in their whole construction circumference, having a constructively permitting their controlled deformation in function of their particular design, a fact which promotes their better accommodation as the closing blade 3 advances, thus actually assuring a more efficient sealing.

The hose sections 7, due to the fact of being hollow, count with a sealed circumferential pneumatic chamber each 8, filled with air.

Due to the fact of being pneumatic, the chamber 8 permits that the contact face of the hose section 7 can be deformed in relation to the closing blade 3 in a more uniform way, a condition obtained especially due to the compression effect of the air volume contained inside the mentioned chamber 8 in each one of the two hose sections 7. Such controlled deformation is verified especially when the closing blade 3 starts its movement between the hose sections 7.

In other words, the closing blade 3, when advancing between the hose sections 7, promotes the progressive elevation of the air pressure contained inside the pneumatic chambers 8 of each one of the referred-to hose sections, thus assuring a higher efficiency of the direct contact between the contact faces and the surface of the closing blade faces 3. The pressure elevation of the pneumatic chamber 8 in function of the deformation caused by the closing blade 3 increases also the sealing effect caused by the hose sections 7 on the mentioned blade, consequently raising the efficiency of the valve actuation as a whole.

The fact of the pneumatic chamber 8 being circular causes the air pressure elevation in its interior to exercise a fully uniform compression along the total circumference of the hose sections 7.

The hose sections 7 further distinguish themselves from the sealing effect pertaining to the state of the art due to the fact of presenting a convex contour of their internal faces 9, a format which causes the proper pipeline fluid pressure to provide an increment in the resulting forces acting in axial flow direction, considerably reducing the need for previous compression of the referred-to hose sections and assuring a total seal while the valve remains open to the passage of the pipeline flow.

The hose sections 7 present further another aspect distinguishing their particular constructively from the constructively pertaining to the state of the art, i.e., the fact of incorporating, each one, a "T" shaped metal core 10.

Each metal core 10 is composed of two independent portions, indicated by the reference numbers 11 and 12. The function of the tubular portion 11 is to provide rigidity to the seal, while the other portion 12, which has the form of a disk, acts as a distribution ring of the load exercised by the pipeline flanges (not shown), thus dismissing the use of external rings, normally recommended to be placed between the pipeline flanges and the valves presently available on the market.

The hose sections 7 integrating the present invention patent are produced by specially designed molds for the identical reproduction of the parts, thus assuring a rigorous standard of shape and dimension, from which results their quality.

The hose sections 7 have been designed to present a more easy replacement in case of wear and their assembly and disassembly can be performed without the need to disassemble the valve, a fact which makes the field operation easier.

Figure 4:
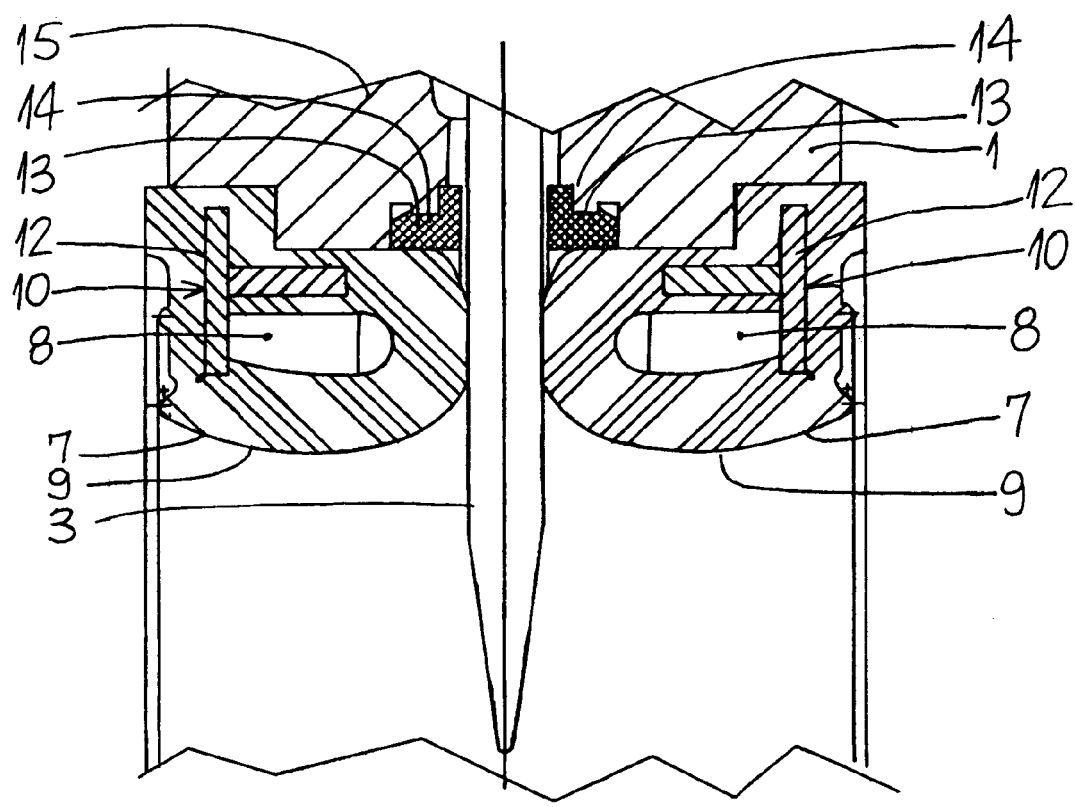
FIG. 4 illustrates a detail similar to that of FIG. 3, representing the start of the advance of the closing blade.

The valve herewith proposed also incorporates sliding rings 13, manufactured from wear resistant plastic material. The sliding rings 13 are installed in corresponding circular grooves 14 defined in the single block body 1 of the valve now proposed, such as can be seen better on FIG. 4, having been designed to assure a perfect sliding of the closing blade 3 during the opening and closing process of the valve.

The sliding rings 13 have the function of avoiding any possibility of a direct contact between the closing blade 3 and the housing 15 of the single block body 1.

As occurs with the hose sections 7, also the sliding rings 13 have been designed to be replaced in case of wear without the need to disassemble the valve, rendering the field operation easier.

The sealing means of the valve now dealt with also count on an upper sealing system 16, formed by a part 17 obtained from an elastomeric compound, which is associated to a metal reinforcement 18.

The upper sealing system 16 presents three purposes which are: a) to assure full tightness as to the occurrence of leaks at the upper part of the valve; b) to avoid the entering of strange matter which may have adhered to the closing blade 3 while the valve had been open during the closing process of the valve; c) to provide to the closing blade 3 the necessary lubrication for reducing the friction between the same and the elastomeric seals, thus assuring an easy and smooth operation, regardless of the type of actuation employed or even of the environment in which the valve shall operate.

Figure 3:
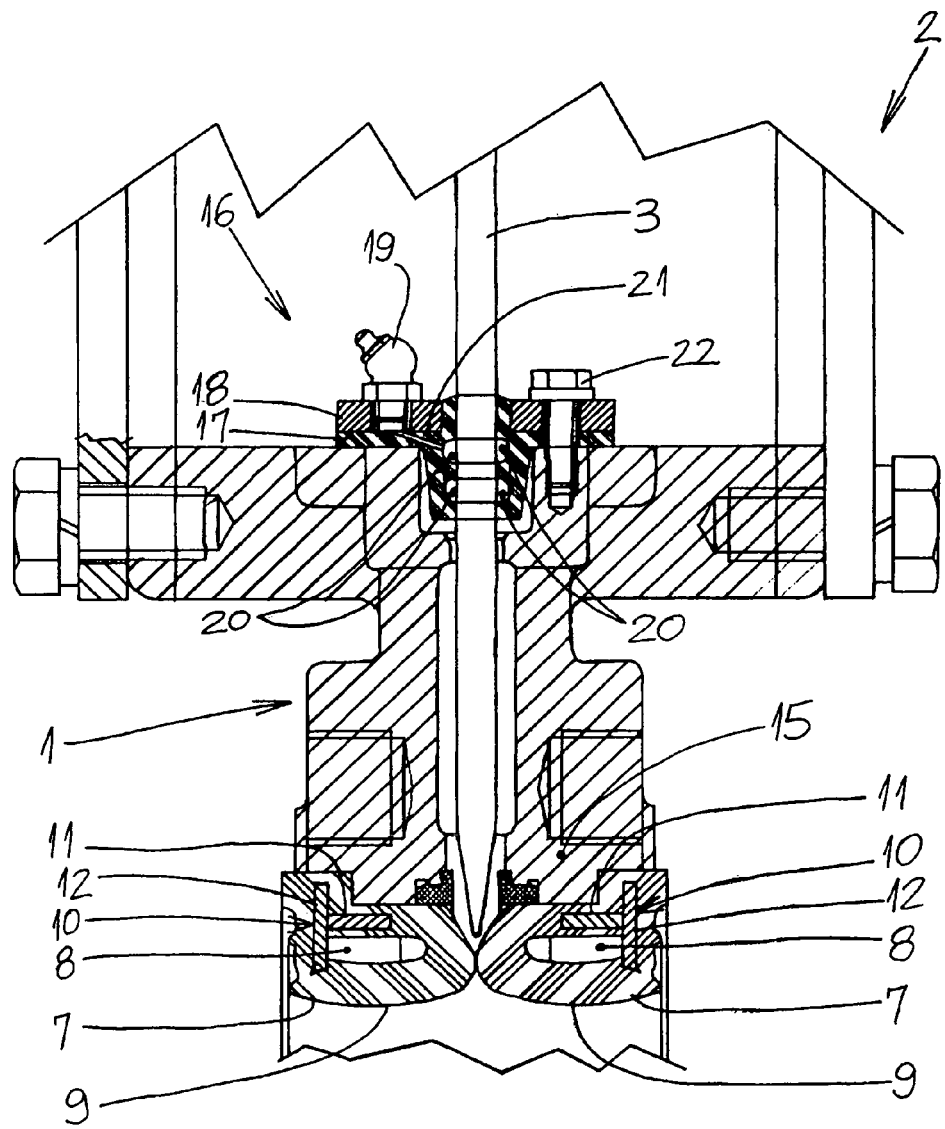
FIG. 3 illustrates an enlarged detail from FIG. 1, such as indicated by the arrow A.

The upper sealing system 16 counts further with two grease nipples 19, of which only 1 can be seen on the cross section of FIG. 3.

The grease nipples 19 are mounted directly through the metal reinforcement part 18 and communicate with the internal region of the elastomeric sealing part 17 where the cavities 20 are located by a channel 21. Thus, the volume of grease of the cavities 20 can be completed without need to disassemble the valve.

The metal reinforcement part 18 is attached to the valve body 1 by means of the bolts 22, as can be also seen on FIG. 3.

As shall have become clear and evident, the guillotine valve now proposed presents a series of constructive aspects which distinguishes the same from the state of the art.

The invention claimed is:

1. A guillotine valve, comprising:
a body; and
two sealing elements mounted oppositely and in mutual contact, said two sealing elements being configured for use in the guillotine valve;
wherein the sealing elements are interchangeable, hollow in their entire construction circumference, and produced of elastomer; and
wherein each one of the sealing elements includes a pneumatic circumferential watertight chamber entirely filled with air; further comprising an upper sealing system comprising a piece having an elastomeric body, which is mounted on a metallic reinforcement, and grease applying devices directly mounted through the metallic reinforcement piece to be in communication through a channel to cavities at an internal area of the elastomeric sealing piece, wherein the metallic reinforcement piece is fixed to the body of the valve by means of screws.

2. A guillotine valve according to claim 1, wherein the sealing elements include a convex contour in their internal faces.

3. A guillotine valve according to claim 2, wherein the convex contour of the internal face of each one of the sealing elements provides an increment in a resultant of forces that act in an axial direction of flow.

4. A guillotine valve according to claim 1, wherein each sealing element incorporates a metallic core in a form of "T", each metallic core comprising two independent portions, a tubular portion to provide stiffness to the sealing element and a disk portion which is configured to distribute a load exerted by pipe flanges.

5. A guillotine valve according to claim 1, further comprising sliding rings manufactured of a plastic material resistant to wear; the sliding rings being installed in corresponding ring-like cavities defined in a housing of the body.

* * * * *